United States Patent

Sumner

(10) Patent No.: US 6,784,786 B1
(45) Date of Patent: Aug. 31, 2004

(54) METHOD AND APPARATUS FOR DELIVERING A SUBSCRIBER-CUSTOMIZED GROUP MESSAGE IN A SELECTIVE CALL MESSAGING SYSTEM

(75) Inventor: Terence Edward Sumner, Azle, TX (US)

(73) Assignee: Motorola Inc., Schaumburg, IL (US)

( * ) Notice: Subject to any disclaimer, the term of this patent is extended or adjusted under 35 U.S.C. 154(b) by 1267 days.

(21) Appl. No.: 08/921,884

(22) Filed: Aug. 25, 1997

(51) Int. Cl.[7] .................................................. H04Q 5/22
(52) U.S. Cl. ............................ 340/10.32; 340/825.44; 340/825.47
(58) Field of Search ..................... 340/825.44, 825.47, 340/10.32; 455/38.1, 38.3

(56) References Cited

U.S. PATENT DOCUMENTS

| | | | |
|---|---|---|---|
| 4,618,860 A | * 10/1986 | Mori | 340/825.44 |
| 4,674,040 A | 6/1987 | Barker et al. | |
| 5,173,688 A | * 12/1992 | DeLuca | 340/825.44 |
| 5,241,305 A | * 8/1993 | Fascenda | 340/825.44 |
| 5,345,227 A | * 9/1994 | Fascenda | 340/825.44 |
| 5,450,071 A | * 9/1995 | DeLuca | 340/825.44 |
| 5,481,254 A | * 1/1996 | Gaskill | 340/825.44 |
| 5,493,282 A | * 2/1996 | Petreye | 340/825.44 |
| 5,535,428 A | * 7/1996 | King | 340/825.44 |

* cited by examiner

Primary Examiner—Brian Zimmerman
(74) Attorney, Agent, or Firm—Matthew C. Loppnow; R. Louis Breeden

(57) ABSTRACT

A selective call messaging system delivers (602, 604, 606) a master message (324) addressed to a first group of subscriber units (102) and a corresponding records message (326) addressed to a second group of subscriber units. The records message comprises a record (514). A subscriber unit of the second group presents (736) a subscriber-customized group message (332) to a user. The subscriber-customized group message is formed (722, 726, 730, 734) from the master message and from at least one of the record, and local information (328) stored in the subscriber unit.

17 Claims, 4 Drawing Sheets

METHOD AND APPARATUS FOR DELIVERING A SUBSCRIBER-CUSTOMIZED GROUP MESSAGE IN A SELECTIVE CALL MESSAGING SYSTEM

FIELD OF THE INVENTION

This invention relates in general to selective call messaging systems, and more specifically to a method and apparatus for delivering a subscriber-customized group message in a selective call messaging system.

BACKGROUND OF THE INVENTION

Modern selective call messaging systems can deliver a message to one of a plurality of subscriber units through well-known selective addressing techniques. Such systems also can deliver a single message to a group of subscriber units through well-known group messaging techniques. Group messages have typically been used for information services messages, such as weather reports, sports information, and news. Group messages have proven to be a highly efficient tool for conveying information to large groups of subscribers through a single transmission.

A limitation of prior art selective call messaging systems has been an inability to subscriber-customize a group message. That is, all subscriber units addressed by a group message have displayed the same identical message. This type of operation has worked reasonably well for information services messages, but does not work as well for other types of messages that can require some degree of customization on a subscriber basis.

Thus, what is needed is a method and apparatus for delivering a subscriber-customized group message. Preferably, the method and apparatus will retain the high efficiency characteristics of the prior art group messaging techniques, while adding a significant degree of customization for each subscriber receiving the group message.

SUMMARY OF THE INVENTION

An aspect of the present invention is a method in a selective call messaging system for delivering a subscriber-customized group message. The method comprises the step of delivering a master message addressed to a first group of subscriber units and a corresponding records message addressed to a second group of subscriber units. The records message comprises a record. The method further comprises the step of presenting the subscriber-customized group message to a user by a subscriber unit of the second group. The subscriber-customized group message is formed from the master message and from at least one of the record, and local information stored in the subscriber unit.

Another aspect of the present invention is a subscriber unit in a selective call messaging system for receiving a subscriber-customized group message. The subscriber unit comprises a receiver for receiving a master message addressed to a first group of subscriber units and a corresponding records message addressed to a second group of subscriber units. The records message comprises a record. The subscriber unit further comprises a processing system coupled to the receiver for processing the master and records messages, and a user interface coupled to the processing system for cooperating with the processing system to present the subscriber-customized group message to a user. The subscriber-customized group message is formed from the master message and from at least one of the record, and local information stored in the subscriber unit.

Another aspect of the present invention is a controller for delivering a subscriber-customized group message. The controller comprises an input interface for receiving a master message addressed to a first group of subscriber units and a corresponding records message addressed to a second group of subscriber units. The records message comprises a record. The controller further comprises a processing system coupled to the input interface for processing the master and records messages and for selecting a local record from the records message to be delivered in a local records message to a subscriber unit served by the controller. The controller also includes an output interface coupled to the processing system for delivering the master message and the local records message to the subscriber unit. The master message and the local records message are such that they can be utilized by the subscriber unit to form the subscriber-customized group message from the master message and from at least one of the local record, and local information stored in the subscriber unit.

DETAILED DESCRIPTION OF THE DRAWINGS

Figure 1:
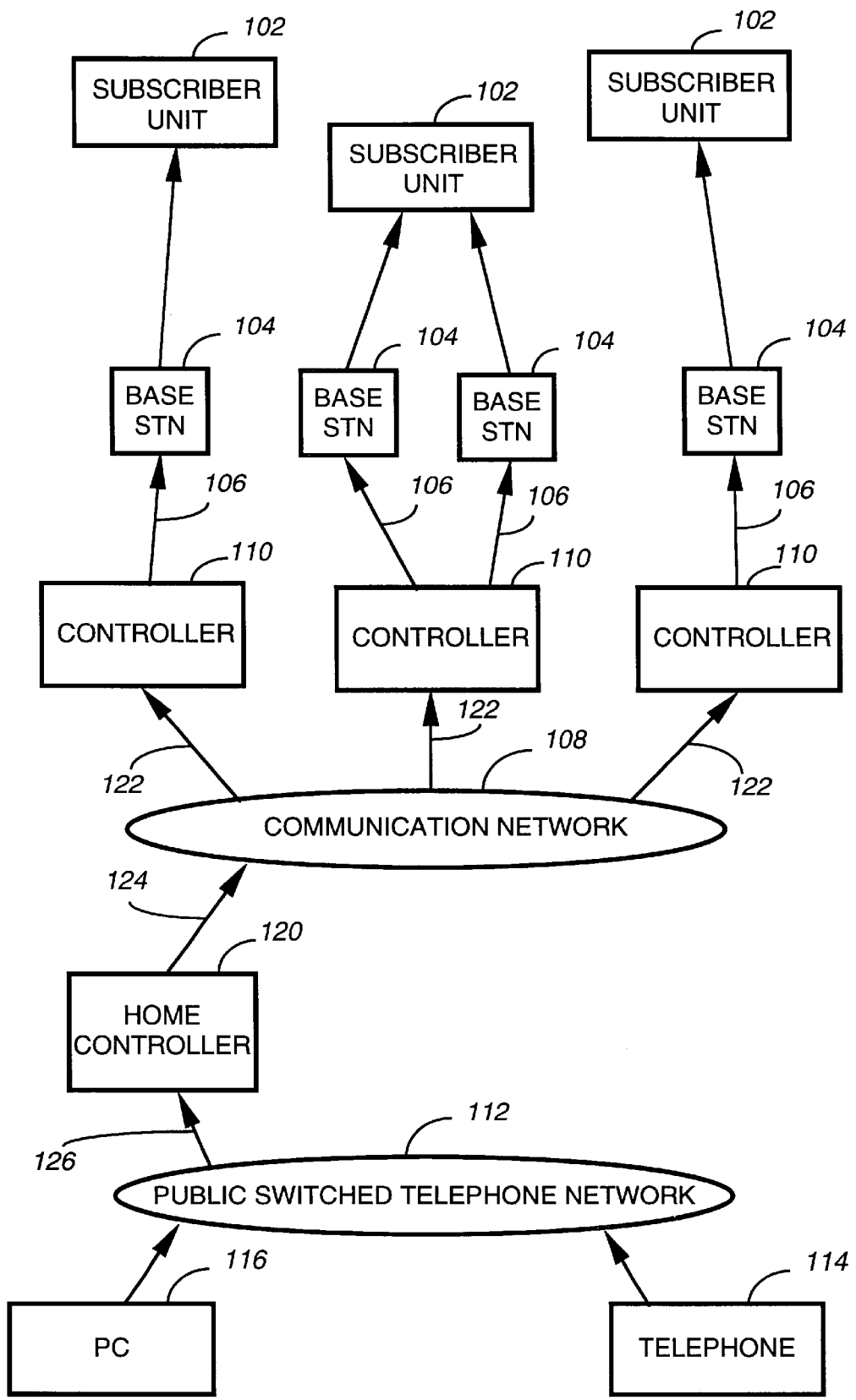
FIG. 1 is an electrical block diagram of a selective call messaging system in accordance with the present invention.

Referring to FIG. 1, an electrical block diagram of a selective call messaging system in accordance with the present invention comprises a plurality of subscriber units 102, which communicate by radio with a fixed portion of the radio system, comprising a plurality of base stations 104 and a plurality of controllers 110. Each of the controllers 110 preferably provides service to subscriber units 102 operating in the locale of the controller 110. The controllers 110 are thus sometimes referred to herein as "local controllers" 110. The base stations 104 are coupled via communication links 106 to the plurality of controllers 110 for control by and communication with the plurality of controllers 110 utilizing well-known techniques. The base stations 104 can comprise collocated transmitters and receivers, transmitters only, or additional base station receivers only, as necessary to meet system radio frequency (RF) coverage requirements. The controllers 110 are coupled to a home controller 120 via communication links 122, 124, and via a conventional communication network 108 for receiving the selective call messages from the home controller 120. The home controller 120 and the controllers 110 preferably communicate by utilizing a well-known protocol, e.g., the Telocator Network Paging Protocol (TNPP), the Wireless Messaging transfer protocol (WMtp™), or the InterPaging Networking Protocol (IPNP). It will be appreciated that, alternatively, the home controller 120 and the controller lo can be collocated. The home controller 120 is preferably coupled via telephone links 126 to a public switched telephone network 112 (PSTN) for receiving the messages from message originators utilizing, for example, a telephone 114 or a personal computer 116 to originate the messages. It will be appreciated that, alternatively, other types of communication networks, e.g., packet switched networks, local area networks, and the Internet can be utilized as well for transporting originated messages to the home controller 120. The hardware of the home controller 120 is preferably similar to the Wireless Messaging Gateway (WMG™) Administrator! paging terminal, while the hardware of the controllers 110 is preferably similar to that of the RF-Conductor!™ message distributor, both manufactured by Motorola, Inc. of Schaumburg, Ill. The hardware of the base stations 104 is preferably similar to that of the Nucleus® Orchestra! transmitter and the RF-Audience!™ inbound base receiver manufactured by Motorola, Inc. It will be appreciated that other similar hardware can be utilized as well for the home controller 120, the controllers 110, and the base stations 104. It will be further appreciated that the present invention can be applied to both one-way and two-way selective call messaging systems.

The protocol utilized for transmitting the messages between the base stations 104 and the subscriber units 102 is preferably similar to Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other similar messaging protocols can be used as well.

Figure 2:
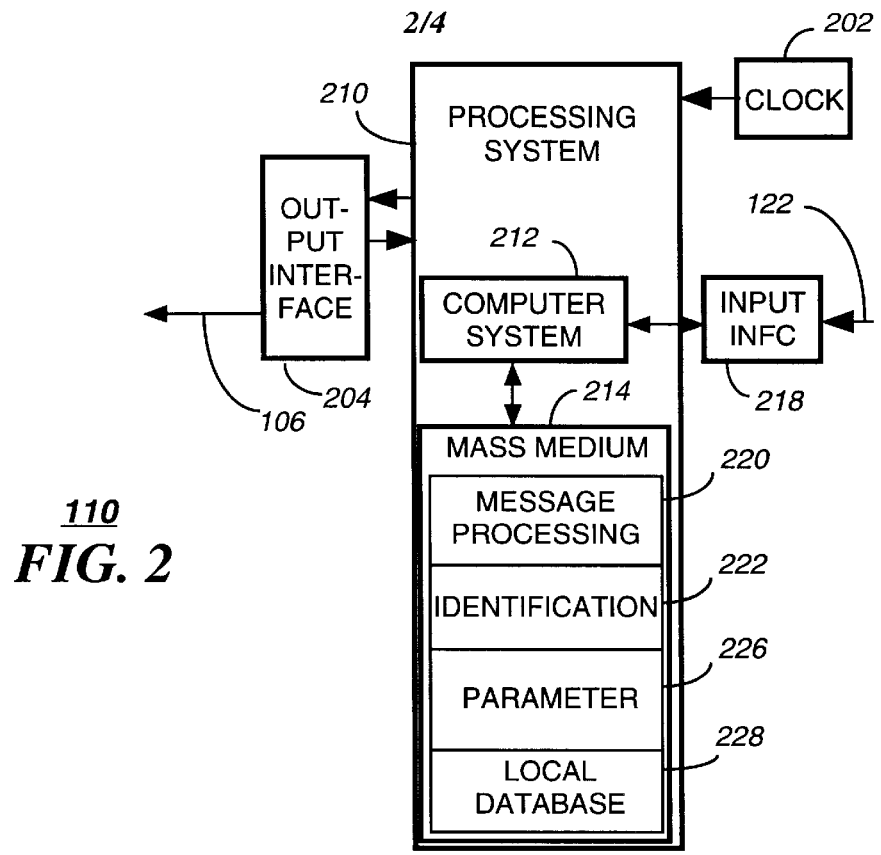
FIG. 2 is an electrical block diagram of a controller in accordance with the present invention.

FIG. 2 is a simplified electrical block diagram of the controller 110 in accordance with the present invention. The controller 110 includes a processing system 210, a conventional output interface 204, a conventional input interface 218, and a clock 202.

The processing system 210 is used for directing operations of the controller 110. The processing system 210 preferably is coupled through the output interface 204 to the base stations 104 via the communication links 106. The processing system 210 is also coupled to the input interface 218 for accepting outbound voice and data messages originated by callers communicating via the PSTN 112. In addition, the processing system 210 is coupled to the clock 202 for including a time stamp in one of a master message and a corresponding records message in accordance with the present invention, as described further below.

In order to perform the functions necessary for controlling operations of the controller 110 and the base stations 104, the processing system 210 preferably includes a conventional computer system 212, and a conventional mass storage medium 214. The conventional mass storage medium 214 includes, for example, a local database 228, comprising subscriber information such as addressing and programming options of the portable subscriber units 102 served by the controller 110.

The conventional computer system 212 is preferably programmed by way of software included in the conventional mass storage medium 214 for performing the operations and features required in accordance with the present invention. The conventional computer system 212 preferably comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as, for example, storing and queuing messages originated by callers using the PSTN 112, processing acknowledgments received from the portable subscriber units 102, and protocol processing of messages destined for the portable subscriber units 102. The conventional mass storage medium 214 is preferably a conventional hard disk mass storage device.

It will be appreciated that other types of conventional computer systems 212 can be utilized, and that additional computer systems 212 and mass storage media 214 of the same or alternative type can be added as required to handle the processing requirements of the processing system 210.

A message processing element 220 is included in the mass medium 214 for processing subscriber-customized messages in accordance with the present invention. The mass medium 214 also includes a identification element 222 for including a message identifier for identifying a master message and a records message that are to paired. In addition, the mass medium 214 includes a parameter element 226 for including in at least one of the master message and the local records message at least one parameter selected from: (a) a calculation description corresponding to a field that requires a calculation for completion, (b) a logic switch for controlling a portion of the master message, (c) a multi-variable field comprising a plurality of field variables to be selected by the subscriber unit in forming the subscriber-customized group message, (d) a disposition indicator for controlling a first response of the subscriber unit to an address in the local records message, and (e) a location sensitivity flag for controlling a second response of the subscriber unit to a change in location identifiers between the master message and the local records message.

Figure 3:
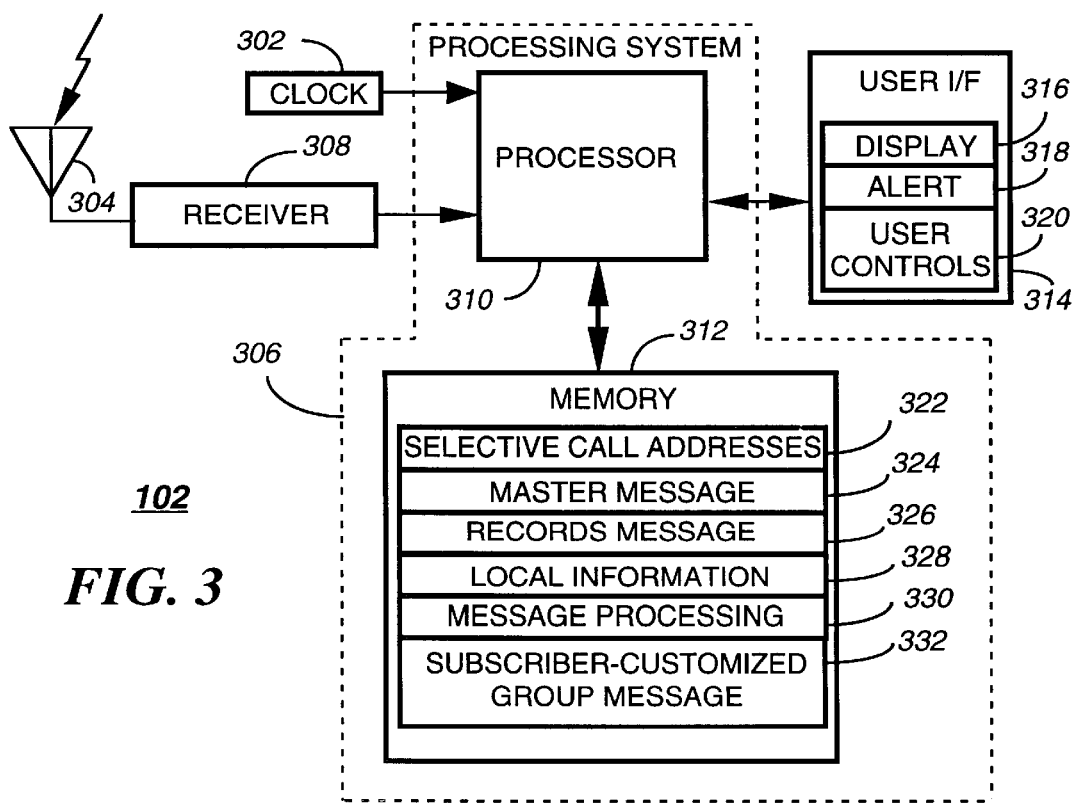
FIG. 3 is an electrical block diagram of a subscriber unit in accordance with the present invention.

Referring to FIG. 3, an electrical block diagram of the subscriber unit 102 in accordance with the present invention comprises an antenna 304 for intercepting transmissions from the base stations 104. The antenna 304 is coupled to a conventional receiver element 308 for receiving the transmissions to derive information therefrom. The receiver element 308 is coupled to a processing system 306, comprising a conventional processor 310 for processing the received information. The processing system 306 is also coupled to a clock 302 for performing timing in accordance with the present invention. The processing system is also coupled to a user interface 314 for conveying portions of the received information to a user, via, for example, a conventional liquid crystal display 316. The user interface 314 also includes a conventional alert element 318 for alerting the user that new information has arrived. In addition, the user interface 314 includes well-known user controls 320 for controlling the subscriber unit 102. The processor 310 is coupled to a conventional memory 312 for storing preprogrammed selective call addresses 322 to which the subscriber unit 102 is responsive. In accordance with the present invention, the selective call addresses 322 include a first group address, a second group address, a unit identifier (i.e., a short address for uniquely identifying the subscriber unit 102 within the second group address), and a positional address (i.e., a unique position reserved for the subscriber unit 102 in an ordered plurality of records when the records are sent to the second group address without any unit identifiers).

The memory 312 also stores a master message 324, a records message 326, and local information 328 to be combined with or used as default information for the master message 324. The memory 312 also includes a message processing element 330 for programming the processor 310 to process the master message 324, the records message 326, and the local information 328 in accordance with the present invention. In addition the memory 312 comprises a location for storing a subscriber-customized group message 332 formed by the processing system 306 in accordance with the present invention.

Figure 4:
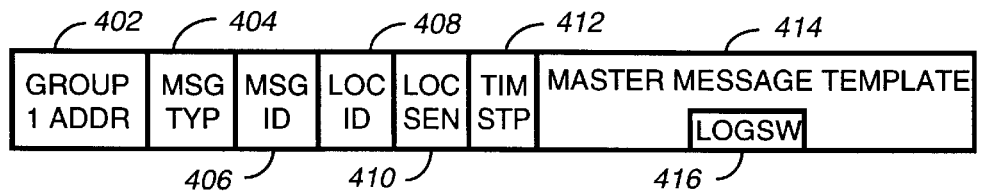
FIG. 4 is a message structure diagram of a master message in accordance with the present invention.
Figure 5:
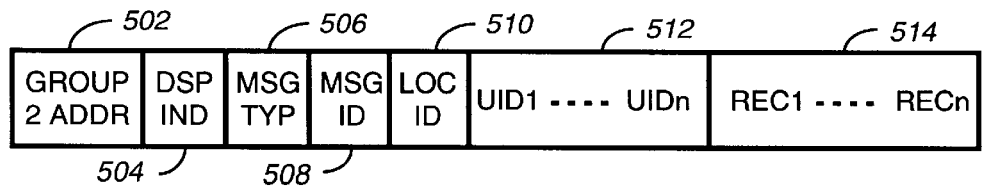
FIG. 5 is a message structure diagram of a records message in accordance with the present invention.

FIG. 4 is a message structure diagram of the master message 324 in accordance with the present invention. The master message 324 includes a first group address 402 for addressing a first group of subscriber units 102, and a message type flag 404 for defining the message to be the master message 324. The master message 324 further comprises a message identifier 406 for identifying the master message 324 such that the master message 324 can be paired with a records message 326 (FIG. 5) having a like-valued message identifier 508 (FIG. 5). The master message 324 also includes a location identifier 408 for identifying a location to which the master message 324 is applicable. In addition, the master message 324 includes a location sensitivity flag 410 for indicating whether the master message 324 is sensitive to location and thus needs to be delivered to a location compatible with the location identifier 408. It will be appreciated that, alternatively, the location sensitivity flag 410 can reside in the records message 326 The master message 324 further includes a time stamp 412 for indicating a time by which a paired records message 326 must be available. It will be appreciated that, alternatively, the time stamp 412 can reside in the records message 326. This is preferable if the records message 326 is transmitted prior to the master message 324. In addition, the master message 324 comprises a master message template 414, which includes message text and fields to be completed in cooperation with the records message 326. The master message template 414 can also include a logic switch 416, which, for example, controls whether all or only a portion of the master message template 414 is to be displayed, dependent upon a logic condition.

FIG. 5 is a message structure diagram of the records message 326 in accordance with the present invention. The records message 326 comprises a second group address 502 for addressing a second group of subscriber units 102. It will be appreciated that, dependent upon the nature of the master and records messages 324, 326, the second group address 502 can be the same as the first group address 402, or the second group address 502 can be different from the first group address 402, representing a subset of the subscriber units 102 addressed by the first group address 402. For example, a single generic master message 324 comprising a weather report template can be addressed to a group of subscriber units 102 in Chicago, New York, and Los Angeles, while three separate records messages 326 are addressed to three separate groups of subscriber units 102 corresponding to each of these three cities. In this example, each records message 326 would comprise weather data such as temperature range, precipitation amount, and humidity as determined for the corresponding city.

The records message 326 further comprises a disposition indicator 504 for indicating whether to include, or exclude, subscriber units 102 that are identified by (optional) unit identifiers 512 of the records message 326. When the disposition indicator 504 is set to "exclude," the records message 326 is sent to all the subscriber units 102 addressed by the second group address. 502, except for the subscriber units 102 identified by the unit identifiers 512 (if any). When the disposition indicator 504 is set to "include " the records message 326 is sent only to the subscriber units 102 identified by the unit identifiers 512. It will be appreciated that when the disposition indicator 504 is set to "include," the unit identifiers 512 are required, and there is a one-to-one correspondence between the unit identifiers 512 and a set of records 514. When the disposition indicator 504 is set to "exclude," however, there is no correspondence between the unit identifiers 512 and the set of records 514. For this reason, when the disposition indicator 504 is set to "exclude," the records 514 preferably are sent for all of the subscriber units 102 responsive to the second group address 502, including "dummy" records for the excluded subscriber units 102. This allows each subscriber unit 102 to locate its respective record 514 by the position of the record 514 in the set of records 514, by utilizing the positional address preprogrammed into the subscriber unit 102. Alternatively, the master message template 414 can simply specify that a single default message is to be sent to all subscriber units 102 addressed by the second group address 502, except those corresponding to the excluded unit identifiers 512. In the latter case, the records message 326 will include only a single default record 514. It will be appreciated that, alternatively, the disposition indicator 504 can reside in the corresponding master message 324.

The records message 326 also includes a message type flag 506 for defining the message to be the records message. 326. Also included is a message identifier 508 for identifying the records message 326 so that the records message 326 can be paired by the subscriber unit 102 with a corresponding master message 324 having a like-valued message identifier 508. The records message 326 further comprises a location identifier 510 for identifying a location to which the records message 326 is applicable. The records message 326 also includes the unit identifiers 512 and at least one record 514. Each record 514 preferably comprises subscriber-customized information corresponding to the subscriber units 102 that will receive the records message 326.

The following example demonstrates the use of the master message 324 and the records message 326 for sending subscriber-customized messages. For simplicity, assume that master message 324 and the records message are both sent to the same group addresses 402, 502, which include three subscriber units 102. The disposition indicator 504 indicates "include," and there are three unit identifiers 512 to be included. The master message template 414 is:

Dear $1, your subscription will expire $2. Please remit $3 to $4.

The corresponding records message 326 contains three records 514, as follows:

Mr. Trimble, Mar. 15, 1998, $22.00, Plaice Communications.

Ms. Smith, Mar. 19, 1998, $25.00, Plaice Communications.

Mr. Lin, Mar. 17, 1998, $21.00, Argot Electronics.

The following three messages are displayed by the three subscriber units 102:

Dear Mr. Trimble, your subscription will expire Mar. 15, 1998. Please remit $22.00 to Plaice Communications.

Dear Ms. Smith, your subscription will expire Mar. 19, 1998. Please remit $25.00 to Plaice Communications.

Dear Mr. Lin, your subscription will expire Mar. 17, 1998. Please remit $21.00 to Argot Electronics.

Note that in this example the data sent in the master message template 414 and in the records 514 is advantageously less than the data that would be required to send the three displayed messages individually. For large groups the savings in transmission time can be substantial, yet each message advantageously can be customized with great flexibility.

Figure 6:
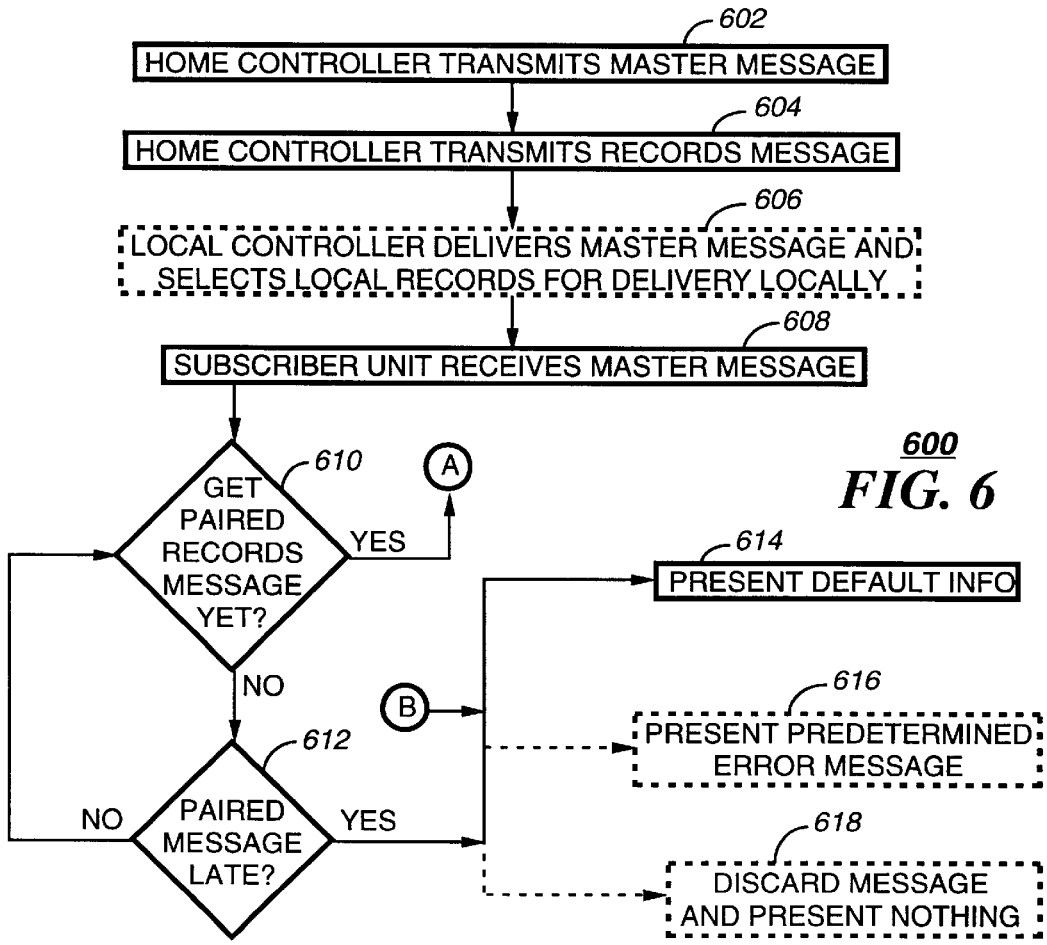
FIGS. 6 and 7 are flow charts depicting operation of the selective call messaging system in accordance with the present invention.
Figure 7:
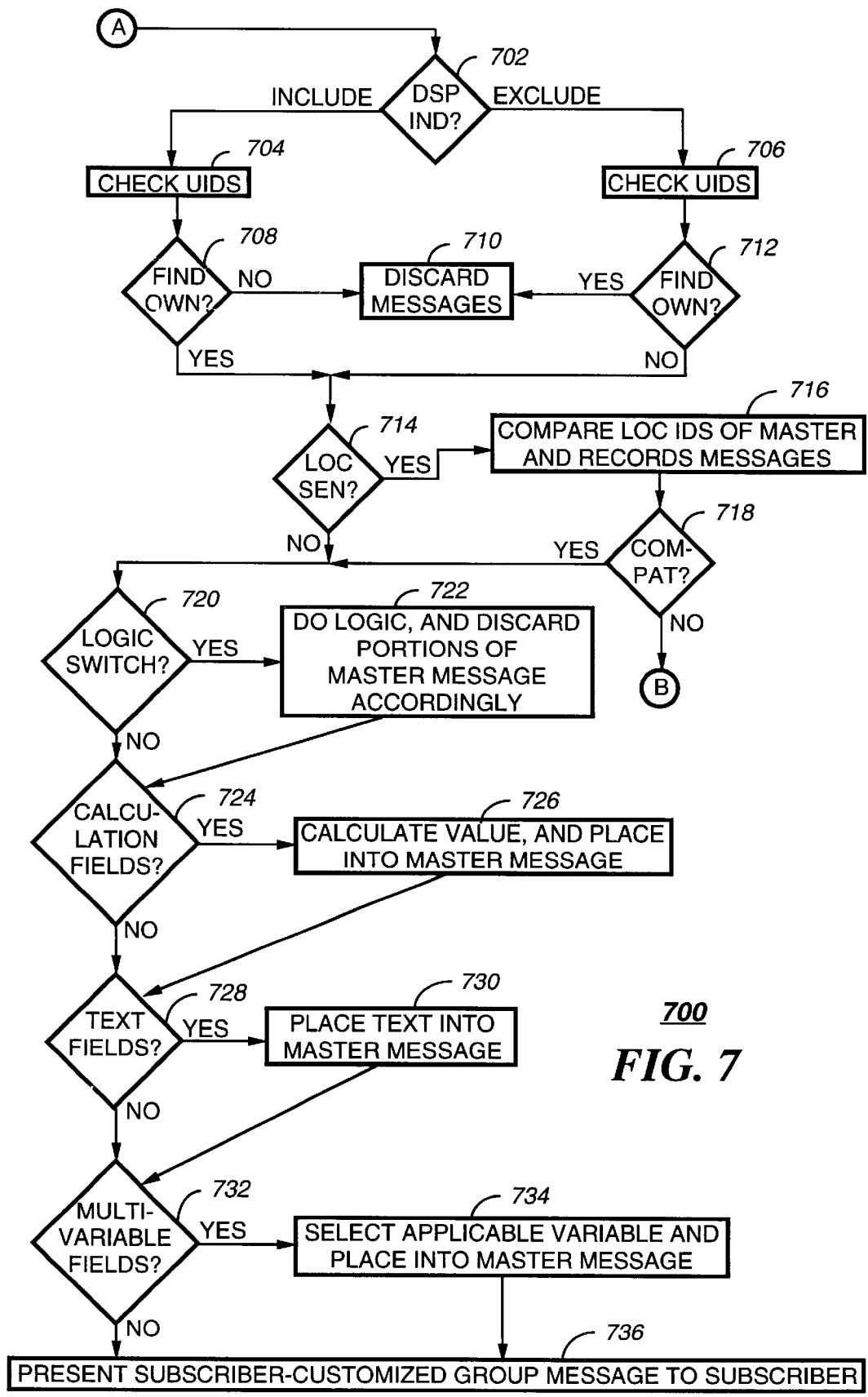

FIGS. 6 and 7 are flow charts 600, 700 depicting operation of the selective call messaging system in accordance with the present invention. The flow chart 600 begins with the home controller 120 transmitting 602 a master message 324. Next, the home controller 120 transmits 604 a corresponding records message 326. The master and records messages 324, 326 have originated from, for example, the personal computer 116. It will be appreciated that, alternatively, the master and records messages 324, 326 can originate from the home controller 120, as well. It will be further appreciated that the master message 324 and the records message 326 can be transmitted in any order; it is not necessary for the master message 324 to be transmitted first.

Next, the controller 110 delivers 606 the master message 324 and, when the controller serves less than all the subscriber units 102 addressed by the second group address 502, selects the local records 514 corresponding to the subscriber units 102 served by the controller 110. The controller 110 preferably performs the selection of the local records 514 by comparing the subscriber units 102 addressed by the records message 326 with the local database 228 of the controller 110. Alternatively, the controller 110 can be assigned a predetermined range of local addresses which comprise a subset of the subscriber units 102 addressed by the second group address 502.

Next, one of the subscriber units 102 receives 608, for example, the master message 324. The processing system 306 stores the master message 324 in the memory 312 for further processing. The processing system 306 of the subscriber unit 102 then checks the message identifier 406 to determine whether it has received the paired records message 326. If not, the processing system 306 compares the time from the clock 302 with the time stamp 412 to determine 612 whether the paired records message is late. If not, the processing system 306 returns to step 610 to see if the records message has been received. If, on the other hand, the paired message is late, the processing system 306 preferably presents 614 default information in the fields of the master message 324. For example, continuing the example given above, the displayed default message can read:

Dear valued customer, your subscription will expire soon. Please remit payment to your service provider.

Alternatively, the processing system 306 can present 616 a predetermined error message to the subscriber. For example:

Please call your service provider.

As a further alternative, the processing system 306 can simply discard 618 the first-received message when the paired message is late.

At step 610 when the paired message does arrive on time, the processing system 306 stores the records message 326 in the memory 312 for further processing. Flow then proceeds to step 702 (FIG. 7). Here the processing system 306 checks the disposition indicator 504 to determine whether to include or exclude the subscriber unit 102 when its own unit identifier is found to be one of the identifiers 512 in the records message 326. If the disposition indicator is set to "include," then the processing system 306 checks 704 the unit identifiers 512, and proceeds to step 708. If at step 708 its own unit identifier is found, then the processing system 306 proceeds to step 714. If its own unit identifier is not found, the processing system 306 discards 710 the master and records messages. On the other hand, when at step 702 the disposition indicator is set to "exclude," then the processing system 306 checks 706 the unit identifiers 512, and proceeds to step 712. If at step 712 its own unit identifier is not found, then the processing system 306 proceeds to step 714. If its own unit identifier is found, the processing system 306 discards 710 the master and records messages. It will be appreciated that, alternatively, the unit identifiers 512 can be expressed in the records message 326 as one or more ranges of unit identifiers, e.g., 1–10, 15–20, 32–50. For that case, the steps 708, 712 instead determine whether the unit identifier of the subscriber unit 102 is found to be included in one of the ranges of unit identifiers 512.

At step 714 the processing system 306 checks the location sensitivity flag 410 to determine 714 whether the messages are location sensitive. If so, the processing system 306 accesses the location identifier element 334 and compares 716 the location identifiers 408, 510 of the master and records messages, respectively. In step 718 the processing system 306 determines whether the location identifiers 408, 510 are compatible. (An example of incompatible messages is a master message 324 with location sensitive information specifically for New York, and a records message 326 with location sensitive information specifically for Chicago.) If the location identifiers 408, 510 are compatible, the flow proceeds to step 720. If not, the flow preferably proceeds to step 614 (FIG. 6) to present default information. Alternatively, the flow can proceed to step 616 to present a predetermined error message, or to step 618 to discard the messages and present nothing.

At step 720 the processing system 306 checks whether there is a logic switch 416 in the master message 324. If so, the processing system 306 evaluates 722 the defined logic, and discards the affected portions of the message in accordance with the outcome. For example, the logic switch might indicate that a predetermined portion of the message is to be omitted when the maximum display length of the subscriber unit 102 is forty characters or less. After evaluating any logic switches in the master message 324, the processing system 306 then checks 724 whether any fields of the messages are calculation fields. If so, the processing system 306 calculates 726 the value of the field and places the value into the message whenever the message is displayed. For example, the calculation field could be the difference in days between a predetermined date and today's date, and an example message could read:

Only 25 shopping days til Christmas!

In the above example message, the number (25) preferably is recalculated whenever the message is recalled for display, thereby changing with the calendar date. Calculation fields can reside in either the master message 324 or the records message 326, or both.

After evaluating any calculation fields in the messages, the processing system 306 checks 728 whether there are text fields in the master message 324. If so, text from the records message 326 is placed 730 into the appropriate fields of the master message 324. The processing system 306 then checks 732 whether multi-variable fields exist in the messages. If so, the processing system 306 selects 734 the applicable variable and places it into the master message 324. For example, the multi-variable field could include "twenty" and "20". A subscriber unit 102 that has alphanumeric display capability would display "twenty," while a numeric-only unit would display "20". Multi-variable fields can reside in either the master message 324 or the records message 326, or both. When the subscriber-customized group message 332 has been formed completely, the processing system 306 then presents 736 the subscriber-customized group message 332 to the subscriber.

It will be appreciated that the steps of the flow chart 700 can, alternatively, be performed in a variety of orders. For example, the steps (720,722), (724,726), (728,730), and (732,734) can be performed in an order different from that depicted in the flow chart 700. As an additional alternative, the fields of the master message 324 can be evaluated and filled in the order in which the fields were transmitted, instead of an order defined by the type of field. These and other variations will occur to one of ordinary skill in the art, and are not deemed to depart from the scope of the claimed invention.

Thus, it should be clear from the preceding disclosure that the present invention provides a method and apparatus for delivering a subscriber-customized group message. Advantageously, the method and apparatus retains the high efficiency characteristics of prior art group messaging techniques, while adding a significant degree of customization for each subscriber receiving the message.

Many modifications and variations of the present invention are possible in light of the above teachings. Thus, it is to be understood that, within the scope of the appended claims, the invention can be practiced other than as described herein above.

What is claimed is:

1. A method in a selective call messaging system for delivering a subscriber-customized group message, the method comprising the steps of:

delivering a master message addressed to a first group of subscriber units and a corresponding records message addressed to a second group of subscriber units, the records message comprising a plurality of records, each record including subscriber-customized information corresponding to a subscriber unit that will receive the records message; and when the subscriber-customized group message has been formed completely in the subscriber unit of the second group, presenting the subscriber-customized group message to a user by the subscriber unit, the subscriber-customized group message formed from the master message and from at least one of:

one of the plurality of records corresponding to the subscriber unit, and local information stored in the subscriber unit.

2. The method of claim 1, wherein the delivering step comprises the step of ordering the master and records messages such that delivery occurs in al order selected from one of:

delivering the master message first, followed by the records message; and delivering the records message first, followed by the master message.

3. The method of claim 1, wherein at least one of the master message and the records message comprises a field that requires a calculation for completion, and wherein the presenting step comprises the step of performing the calculation to form the subscriber-customized group message.

4. The method of claim 1, wherein a portion of the master message is subject to a logic switch, and wherein the presenting step comprises the step of presenting the subscriber-customized group message according to the logic switch.

5. The method of claim 1, wherein at least one of the master message and the records message comprises a multi-variable field that includes a plurality of field variables, and wherein the presenting step comprises the step of selecting a field variable when forming the subscriber-customized group message.

6. The method of claim 1, wherein one of the master message and the records message comprises a time stamp and a message identifier that identifies a paired message that is to be paired with the one of the master message and the records message in forming the subscriber-customized group message, and wherein, in response to the paired message being unavailable to a member of the first group of subscriber units by a time determined from the time stamp, the method further comprises the step, by the member, of performing one of:

discarding the one of the master message and the records message, presenting the subscriber-customized group message by using default information to form the subscriber-customized group message, and presenting a predetermined error message to the user.

7. The method of claim 1, wherein at least one of the master message and the records message comprises a disposition indicator having a value, and wherein the presenting step comprises the step of presenting the subscriber-customized group message in response to one of:

(a) the subscriber unit being identified by a unit identifier in the records message, and (b) the subscriber unit belonging to the second group of subscriber units and not being identified by a unit identifier in the records message, and wherein selection of (a) or (b) is determined by the value of the disposition indicator.

8. The method of claim 1, wherein at least one of the master message and the records message comprises a location sensitivity flag, and wherein the method further comprises the steps of:

storing, in the subscriber unit, a first location identifier received when the master message is delivered;

receiving, by the subscriber unit, a second location identifier when the records message is delivered; and in response to the location sensitivity flag being set and the first and second location identifiers being incompatible with one another, performing, by the subscriber unit, one of:

discarding the master message and the records message, presenting the subscriber-customized group message by using default information to form the subscriber-customized group message, and presenting a predetermined error message to the user.

9. The method of claim 1, wherein the delivering step comprises the steps of:

delivering the master message and the records message to a local controller of the selective call messaging system; and selecting, by the local controller, a local record from the records message to be delivered in a local records message to the subscriber unit when the subscriber unit is served by the local controller.

10. A subscriber unit in a selective call messaging system for receiving a subscriber-customized group message, the subscriber unit comprising:

a receiver for receiving a master message addressed to a first group of subscriber units and a corresponding records message addressed to a second group of subscriber units, the records message comprising a plurality of records, each record including subscriber-customized information corresponding to a subscriber unit that will receive the records message;

a processing system coupled to the receiver for processing the master and records messages; and a user interface coupled to the processing system for cooperating with the processing system, when the subscriber-customized group message has been formed completely in the subscriber unit, to present the subscriber-customized group message to a user, the subscriber-customized group message formed from the master message and from at least one of:
one of the plurality of records corresponding to the subscriber unit, and
local information stored in the subscriber unit.

11. The subscriber unit of claim 10, wherein at least one of the master message and the records message comprises a field that requires a calculation for completion, and
wherein the processing system is programmed to perform the calculation to form the subscriber-customized group message.

12. The subscriber unit of claim 10, wherein a portion of the master message is subject to a logic switch, and
wherein the processing system is programmed to present the subscriber-customized group message according to the logic switch.

13. The subscriber unit of claim 10, wherein at least one of the master message and the records message comprises a multi-variable field that includes a plurality of field variables, and
wherein the processing system is programmed to select a field variable when forming the subscriber-customized group message.

14. The subscriber unit of claim 10, wherein at least one of the master message and the records message comprises a disposition indicator having a value, and
wherein the processing system is programmed to present the subscriber-customized group message in response to one of:
(a) the subscriber unit being identified by a unit identifier in the records message, and
(b) the subscriber unit belonging to the second group of subscriber units and not being identified by a unit identifier in the records message, and
wherein selection of (a) or (b) is determined by the value of the disposition indicator.

15. A controller for delivering a subscriber-customized group message, comprising:
an input interface for receiving a master message addressed to a first group of subscriber units and a corresponding records message addressed to a second group of subscriber units, the records message comprising a plurality of records, each record including subscriber-customized information corresponding to a subscriber unit that will receive the records message;
a processing system coupled to the input interface for processing the master and records messages and for selecting a local record from the records message to be delivered in a local records message to a subscriber unit served by the controller; and
an output interface coupled to the processing system for delivering the master message and the local records message to the subscriber unit,
wherein the master message and the local records message are such that they can be utilized by the subscriber unit to form the subscriber-customized group message from the master message and from at least one of:
the local record, and
local information stored in the subscriber unit.

16. The controller of claim 15, further comprising:
a clock for including a time stamp in one of the master message and the local records message; and
an identification element for including a message identifier for identifying a message that is to be paired with the one of the master message and the local records message.

17. The controller of claim 15, further comprising:
a parameter element for including in at least one of the master message and the local records message at least one parameter selected from:
a calculation description corresponding to a field that requires a calculation for completion,
a logic switch for controlling a portion of the master message,
a multi-variable field comprising a plurality of field variables to be selected by the subscriber unit in forming the subscriber-customized group message,
a disposition indicator for controlling a first response of the subscriber unit to an address in the local records message, and
a location sensitivity flag for controlling a second response of the subscriber unit to a change in location identifiers between the master message and the local records message.

* * * * *